United States Patent [19]
Haas et al.

[11] Patent Number: 4,775,558
[45] Date of Patent: Oct. 4, 1988

[54] POLYURETHANES PREPARED OR COMBINED WITH ANOTHER MATERIAL AND A PROCESS FOR THEIR MANUFACTURE

[75] Inventors: Peter Haas, Haan; Geza Avar, Leverkusen, both of Fed. Rep. of Germany

[73] Assignee: Bayer Aktiengesellschaft, Leverkusen, Fed. Rep. of Germany

[21] Appl. No.: 98,099

[22] Filed: Sep. 17, 1987

[30] Foreign Application Priority Data

Oct. 1, 1986 [DE] Fed. Rep. of Germany ....... 3633365

[51] Int. Cl.⁴ ............................................. C08G 18/14
[52] U.S. Cl. .................................. 427/373; 427/386; 428/424.2; 428/424.4; 428/424.6; 428/424.8; 521/99; 521/102; 521/109.1; 521/114; 524/11; 524/37; 524/42; 524/77; 524/310; 524/313; 524/378; 524/755; 525/129; 525/130; 525/131; 525/454
[58] Field of Search ............... 521/99, 102, 109.1, 521/114, 137; 524/11, 37, 42, 77, 310, 313, 378, 755, 773; 525/129, 130, 131, 454, 455, 460; 427/373, 386; 428/423.4, 424.2, 424.4, 424.6, 424.8, 425.1

[56] References Cited

U.S. PATENT DOCUMENTS 3,281,379 10/1966 Fontaine et al. ..................... 260/2.5
4,271,230 6/1981 Sakano et al. ....................... 428/315

Primary Examiner—Maurice J. Welsh
Attorney, Agent, or Firm—Gene Harsh; Joseph C. Gil; Richard E. L. Henderson

[57] ABSTRACT

Polyurethanes which have been prepared or combined with another material are made by combining or applying a polyurethane-forming reaction mixture or polyurethane to another material such as a PVC foil or textile. The polyurethane-forming mixture or polyurethane is made up of an organic polyisocyanate, a high molecular weight isocyanate reactive material, a catalyst and a stabilizer against thermolysis and contact discoloration. The required stabilizer is an epoxide having an epoxide equivalent weight between 57 and 10,000. Other additives commonly used in polyurethane chemistry such as blowing agents, chain extenders and surfactants may also be employed. The polyurethane composites thus produced are characterized by improved thermal stability and reduced discoloration.

15 Claims, No Drawings

POLYURETHANES PREPARED OR COMBINED WITH ANOTHER MATERIAL AND A PROCESS FOR THEIR MANUFACTURE

BACKGROUND OF THE INVENTION

The present invention relates to polyurethanes combined with or applied to another material and a process for their production.

The manufacture of polyurethanes, optionally in cellular form, which have been prepared or combined with another material is known. For example, PVC foils are back-foamed with a polyurethane and the composite so obtained is used on a large scale for example for automotive seats, covered neckrests or dashboards.

Due to reduced air drag in automobiles and strongly curving windshields and rear windows, the inside automobile temperature rises substantially upon exposure to sunlight. Consequently, the requirements for an acceptable composite made of PVC foil and polyurethane foam have increased. For example, composite dashboards subjected to higher thermal stress become brittle and may break up and the PVC cover layer progressively discolors. Damage to the polyurethane (PUR) foam is also observed. Strong degradation of the cover foils also occurs.

U.S. Pat. No. 3,281,379 discloses the addition of epoxides in order to prevent the self-discoloration of polyurethane foams following heat aging. The present invention, however, is directed to suppression of the damage to a cover layer combined with a polyurethane foam from thermal effects. It has now been found that adding epoxides to an expandable reaction mixture—while not preventing foam discoloration upon prolonged thermal exposure—renders the cover layer color-stable and that this cover layer remains unchanged in its polymer properties and structure.

German Offenlegungsschrift 2,933,173 discloses a costly composite of a thermally cross-linking bonding layer between the foam and the cover layer in which copolymers containing carboxyl groups and deposited on a cover layer are thermally cross-linked and then are back-foamed with an expandable polyurethane reaction mixture. This publication does not however mention the problem addressed by the present invention nor suggest its solution.

SUMMARY OF THE INVENTION

It is an object of the present invention to provide stable polyurethane composite materials having cover layers which do not degrade.

It is also an object of the present invention to provide stable polyurethane composite materials in which the polyurethane which may optionally be foamed exhibits substantially less weight loss, brittleness, polymer decomposition and loss of elasticity than prior art materials.

It is a further object of the present invention to provide a process for the production of such stable polyurethane composite materials.

These and other objects which will be apparent to those skilled in the art are accomplished by reacting an organic polyisocyanate with a compound containing at least two isocyanate-reactive hydrogen atoms and having a molecular weight of from 400 to 10,000 in the presence of a catalyst and 0.01 to 50 parts by weight (pbw) per 100 pbw isocyanate reactive compound of a stabilizer against thermolysis and contact discoloration. The stabilizer is an epoxide having an epoxide equivalent weight of from 57 to 10,000. Other known additives such as blowing agents, chain extenders and foam stabilizers may optionally be included in the reaction mixture. The polyurethane-forming material or the product polyurethane may be combined with or applied to another material which is preferably a plastic or a textile.

DETAILED DESCRIPTION OF THE INVENTION

The present invention relates to a process for the production of optionally cellular polyurethanes which are combined or were prepared with another material. In this process, a compound having a molecular weight of from 400 to 10,000 and having at least two hydrogen atoms reactive with isocyanates is reacted with a polyisocyanate in the presence of a catalyst and an anti-thermolysis and anti-contact discoloration stabilizer. A chain extender having a molecular weight of from 32 to 399, a foam stabilizer, water and/or other foaming agents and other auxiliary agents and additives may also be included in the reaction mixture. The polyurethane-forming mixture or the product polyurethane is combined or prepared with another material. The stabilizer employed against thermolysis and contact discoloration is an epoxide, preferably a polyfunctional epoxide having an epoxide equivalent weight of from 57 to 10,000, preferably from 75 to 3,000 and most preferably from 100 to 1000. This stabilizer is used in an amount of 0.01 to 50 parts by weight for every 100 parts by weight of the high molecular weight compound (molecular weight of from 400 to 10,000) containing at least two hydrogen atoms reactive with isocyanate.

The other materials with which the polyurethane or polyurethane-forming mixture may be combined or prepared include: plastics, preferably of PVC, ABS, mixtures of PVC and ABS, polyvinylacetate, polyvinyl-butyral, and homopolymers based on vinyl chloride, styrene, butadiene, isoprene, chloroprene, dichlorobutadiene, ethylene, propene or acrylonitrile and their chloro- and chlorosulfonation derivatives in the form of foils, coatings and edgings, lacquers based on cellulose esters or cellulose ethers, epoxide resins or alkyd resins and also oil varnishes and combination lacquers of these components and textiles based on cotton or leather.

In the present invention, the polyfunctional epoxide is preferably a polyglycidyl ether or ester and/or 1,2-polyepoxide with at least one tertiary nitrogen atom. However, modified epoxides of high molecular weight which are prepared by reacting excess polyglycidyl ether or ester and/or 1,2-polyepoxide having at least one tertiary nitrogen atom with a polyether polyol or polyester polyol containing carboxyl groups may also be used. Bisphenol-A-bisglycidylether and its higher homologs are preferred polyfunctional epoxides.

The polyurethane foams modified with epoxy groups prepared in accordance with the present invention exhibit a surprisingly high degree of stability relative to their cover layer. Degradations that occurred in the laminate layer such as brittleness, chipping from elongation rupture and discoloration experienced with prior art materials are controlled. As a result, the appearance of the composite material prepared in accordance with the present invention is mechanically and optically unchanged following thermal stresses.

The starting components used to manufacture the optionally foamed polyurethane of the present invention include organic polyisocyanates, a high molecular weight isocyanate-reactive material, a catalyst, a stabilizer against thermolysis and discoloration and other known additives.

Suitable polyisocyanates include: aliphatic, cycloaliphatic, araliphatic, aromatic and heterocyclic polyisocyanates such as those described by W. Siefken in Justus Liebigs Annalen, 362, pages 75-136, and those represented by the formula

in which n=2-4. preferably 2 to 3, and Q represents an aliphatic hydrocarbon radical with 2-18 (preferably 6-10) carbon atoms, a cycloaliphatic hydrocarbon radical with 4-15 (preferably 6-13) carbon atoms, or an araliphatic hydrocarbon radical with 8-15 (preferably 8-13) carbon atoms. Specific examples of such polyisocyanates are given in German Offenlegungsschrift No. 2,832,253 on pages 10-11.

Generally, the industrially readily available polyisocyanates such as 2,4- and 2,6-toluylenediisocyanate and mixtures of these isomers ("TDI"), polyphenyl-polymethylene polyisocyanates such as those produced by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates"), in particular those modified polyisocyanates derived from 2,4- and/or 2,6-toluylenediisocyanate or from 4,4'- and/or 2,4'-diphenylmethanediisocyanate are particularly preferred.

Suitable compounds having at least two hydrogen atoms reactive with isocyanates and having a molecular weight of from 400 to 10,000 include compounds containing amino groups, thiol groups, carboxyl groups and preferably compounds containing hydroxyl groups. Compounds having from 2 to 8, preferably 2 to 6 hydroxyl groups, specifically those with a molecular weight between 1,000 and 6,000, preferably between 2,000 and 6,000, such as polyesters, polyethers, polythioethers, polyacetals, polycarbonates and polyester amides are particularly preferred. Such compounds are known to those skilled in the art to be useful in the manufacture of homogeneous and cellular polyurethanes and are described, for example, in German Offenlegungsschrift No. 2,832,253 at pages 11-18.

Known catalysts may also be used in the practice of the present invention. Examples of catalysts useful in polyurethane forming reactions are given in German Offenlegungsschrift No. 3,435,070 on pages 12-17 and in German Offenlegungsschrift No. 3,244,913 on pages 26-28.

The epoxides used as stabilizers against thermolysis and contact-discoloration in the present invention are preferably polyfunctional (polyepoxides) and have an epoxide equivalent weight of from 57 to 10,000, preferably from 75 to 3,000 and most preferably from 100 to 1,000.

Preferred epoxides are those prepared by epoxidizing unsaturated fatty acids. Among these are the epoxide derivatives of unsaturated triglycerides such as linseed oil, soybean oil, olive oil, rapeseed oil, palm oil, coconut oil and ricinus oil.

Glycidylether- and glycidylester-based epoxides are also extraordinarily effective However, when these epoxides are mixed with the compound containing at least two hydrogen atoms reactive with isocyanates and having a molecular weight of from 400 to 10,000 and a catalyst some problems are occasionally encountered. For example, problems with storage stability of such mixtures occur. When these components are dosed separately, such problems are of course avoided.

Foams prepared in the presence of the epoxy fatty acids offer the further advantage of unchanged elasticity in the thermally stressed foams. The glycidylether- and the glycidylester-based epoxides often allow post-hardening of the foams during testing.

In a preferred embodiment of the present invention, the epoxidation product of an unsaturated fatty acid, particularly the epoxide of linseed oil, the epoxide of soybean oil, the epoxide of coconut oil, the epoxide of ricinus oil, the epoxide of palm oil and/or the epoxide of olive oil is used.

Other suitable polyepoxides are known and include preferably halogen-free polyepoxides, particularly polyglycidylethers. Examples of these polyepoxides include: the polyglycidylethers of polyvalent phenols of the most diverse kinds such as polyglycidylethers of catechol, resorcin, hydroquinone, 4,4''-dihydroxydiphenylmethane, 4,4'-dihydroxy-3,3'-dimethyldiphenylmethane, 4,4'-dihydroxydiphenylmethylmethane (bisphenol A), 4,4'-dihydroxydiphenylethane, 4,4'-dihydroxydiphenylcyclohexane, 4,4'-dihydroxy-3,3'-dimethyldiphenylpropane, 4,4'-dihydroxydiphenylsulfone, tris-(4-hydroxyphenyl)-methane, novolaks (i.e., reaction products of mono- or polyvalent phenols with aldehydes, in particular formaldehyde in the presence of acid catalysts), diphenols prepared by esterifying 2 mols of the sodium salt of an aromatic oxycarboxylic acid with 1 mol of a dihalogen alkane or dihalogendialkylether (UK Patent No. 1,017,612) and polyphenols prepared by condensing phenols and long-chain halogen paraffins containing at least two halogen atoms (UK Patent No. 1,024,288).

Glycidylethers of polyvalent aliphatic alcohols such as glycidylethers of 1,4-butanediol, 1,4-butenediol, glycerin, trimethylol propane, pentaerythritol and polyethylene glycols are also suitable.

Other polyepoxides which may be used include the glycidylesters of polyvalent aromatic, aliphatic or cycloaliphatic carboxylic acids such as phthalic acid diglycidylester, terephthalic acid diglycidylester, tetrahydrophthalic acid diglycidylester, adipic acid diglycidylester and hexahydrophthalic acid diglycidylester each of which may be substituted by methyl groups. Glycidylesters of the reaction products of 1 mol of an aromatic or cycloaliphatic dicarboxylic-acid anhydride and ½mol of a polyol with "n" hydroxyl groups such as glycidyl carboxylic-acid esters of the general formula

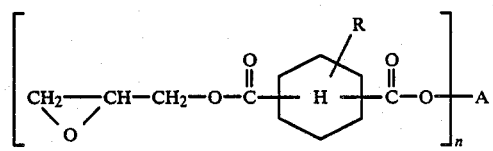

in which
A represents an at least divalent radical of an aliphatic hydrocarbon which may be interrupted by oxygen and/or cycloaliphatic ring or an at least divalent residue of a cycloaliphatic hydrocarbon;

R represents hydrogen or an alkyl radical with 1 to 3 carbon atoms; and n represents an integer between 2 and 6.

Mixtures of compounds corresponding to the general formula may also be used.

1,2-polyepoxides with at least one tertiary nitrogen atom per molecule may also be used. Examples of such 1,2-polyepoxides include: bis-(N-epoxypropyl)aniline, bis-(N-epoxypropyl)-butylamine, bis-(N-epoxyopyl)-4-aminophenylglycidylether, triglycidyl-isocyanurate, N,N'-diepoxypropyloxamide, triglycidyl-1,2,4-triazolidine-3,5-dione (German Offenlegungsschrift No. 2,935,354), glycidyl-2,4-triazolidine-3,5-dione with 2 to 10 glycidyl groups (German Offenlegungsschrift No. 3,027,623), N,N'-diglycidyl-bis-hydantoin compounds (German Auslegeschrift No. 1,670,490), N,N'-diglycidyl compounds of cyclic ureides (UK Patent 1,148,570; German Patent No. 2,263,492 and German Ausleges- chrift No.1,954,503), Polyurethanediglycidylethers (U.S. Pat. No. 2,830,038; German Auslegeschrift No. 1,947,001 and German Auslegeschrift No. 1,966,182) and diglycidylesters containing imide groups (German Auslegeschrift No. 2,306,403).

The 1,2-polyepoxides with at least one tertiary nitrogen atom per molecule may be mixed with nitrogenfree 1,2-polyepoxides, in particular with polyglycidylethers of polyvalent phenols, for example of bisphenol A. Such mixtures may contain from 0.5 to 80 wt % of a 1,2-polyepoxide having at least one tertiary nitrogen atom per molecule and from 20 to 100 wt % of a nitrogen-free aromatic 1,2-polyepoxide.

1,2-polyepoxides, in particular solid 1,2-polyepoxides, can be mixed with reactive thinners such as liquid monoepoxides (for instance phenylglycidylethers, tert.- butylphenylglycidylethers and/or allylglycidylethers) in order to lower the viscosity.

However, polyepoxides based on heterocyclic or cycloaliphatic ring systems such as triglycidyl-striazine, trisglycidylcyanurate, trisglycidylurazole, other ester epoxides such as hexahydrophthalic acid diglycidylester, and epoxides based on aniline, diaminodiphenylmethane, N,N'-dimethylaminodiphenylmethane- or sulfone may also be used.

Other useful polyepoxides may be prepared by reacting acid polyester polyols with excess bifunctional epoxides. The acid polyesterpolyols may be prepared by partially esterifying carboxylic acid anhydrides with higher functional starters or their ethylene oxide or propylene oxide adducts.

Suitable starters include ethylene glycol, diethylene glycol, oligo- and polyethylene-glycols, propylene glycols, oligo- and polypropylene-glycols, trimethylol propane, glycerine, pentaerythritol, sorbitol, sucrose and their propylene oxide/ethylene oxide adducts. Suitable anhydrides include phthalic acid anhydride, hexahydrophthalic acid anhydride, maleic acid anhydride and succinic acid anhydride.

Chain extenders which may be used in the process of the present invention include compounds having at least two hydrogen atoms reactive to isocyanates and having molecular weights between 32 and 399. These chain extenders generally contain hydroxyl groups and/or amino groups and/or thiol groups and/or carboxyl groups. Compounds containing hydroxyl groups and/or amino groups are preferred as chain extenders or crosslinking agents. As a rule these compounds have from 2 to 8, preferably 2 to 4 hydrogen atoms which are reactive with isocyanates. Specific examples of these compounds are given in German Offenlegungsschrift No. 2,832,253 on pages 19-20.

Auxiliaries and additives such as water and/or volatile organic blowing agents, surfactants such as emulsifiers and foam stabilizers, reaction retarders such as hydrochloric acid or organic acid halides, known cell regulators such as paraffins or fatty alcohols or dimethylpolysiloxanes and pigments or dyes and flame retardants (e.g., tris-chloroethylphosphate, tricresylphosphate), stabilizers against aging and weathering, plasticizers and fungistatic and bacteriostatic substances and fillers such as barium sulfate, diatomaceous earth, lampblack, chalk or whiting may also be used to produce the polyurethanes of the present invention.

Examples of auxiliaries and additives which may be used are given in German Offenlegungsschrift No. 2,732,292, pages 21-24. Additional examples of surfactant additives and foam stabilizers that may be used in the present invention, as well as cell regulators, reaction retarders, stabilizers, flame retardants, plasticizers, dyes and fillers, fungistatic and bacteriostatic substances and details concerning the applicability and function of these additives are given in Kunststoff-Handbuch, Carl-Hanser-Verlag, Munich 1986, at pages 103-113, for example.

To manufacture the polyurethane composites or the built-up polyurethanes of the present invention, the polyurethane produced from the above-described reaction components is processed in known manner with other materials to form for example, a coating, cover layer or lacquer layer on the polyurethane. The combination into a composite may take place simultaneously with the production of the polyurethane (e.g. back-filling) or after the preparation of the polyurethane. The build-up of the polyurethane, e.g., by providing it with a leather or textile coating, generally takes place after production of the polyurethane by a known technique.

In the present invention, the reagents are made to react by the known single-stage method, the prepolymer method or the semi-prepolymer method. Machinery which may be used is described, for example in U.S. Pat. No. 2,764,565. Details concerning the processing equipment which may be used in the practice of the present invention may be found in KunststoffHandbuch, Vol. VII, Vieweg & Hoechler, Carl-Hanser-Verlag, publishers, Munich 1966, pages 121-205.

When making a polyurethane foam, the expansion is preferably carried out in closed molds. The reaction mixture is introduced into a mold. The mold may be made of, for example, aluminum or plastic (e.g. epoxy resin). Inside the mold, the expandable reaction mixture expands to form the molded article. The mold expansion can be carried out in such a manner that the product has a cellular structure at its surface or a dense skin and a cellular core. The foaming procedure may be such that the precise amount of expandable reaction mixture is introduced in the mold in a quantity such that the formed foam will just fill the mold. However the procedure also may be such that more foam-forming reaction mixture is introduced into the mold than is needed to fill the mold with foam. The latter procedure is the so-called "overcharging" technique and is described, for example, in U.S. Pats. No. 3,178,490 and 3,182,104.

Frequently, known "external mold release agents" such as silicone oils are used in the molding process. However, so-called "internal mold release agents" may also be used. A combination of internal and external mold release agents may also be employed. Examples of suitable internal mold release agents are given, for example, in German Offenlegungsschriften Nos. 2,121,670 and 2,307,589.

In the molding procedure, the mold is preferably either not heated or is kept at constant temperature thermostatically. (See German Patent No. 1,162,517 and German Offenlegungsschrift No. 2,153,086).

Obviously foams may also be made by foam slabstock continuous production or by the known laminator method.

The polyurethanes produced and combined or prepared with another material in accordance with the present invention are useful as dashboard covers, arm rests, car roofs, in refrigeration equipment, bedding and seats, mattresses, headrests and seats in vehicles such as cars, trains and planes.

The invention is further illustrated, but is not intended to be limited by the following examples in which all parts and percentages are by weight unless otherwise specified.

EXAMPLES

Preparation of the Epoxides

Epoxide I. A mixture of 200 g of propylene glycol with an OH numbers of 112, 39.2 g of maleic acid anhydride and 0.2 g of hydroquinone was heated at 100° C. to an acid number 93, and subsequently heated with 144 g of hexahydrophthalic-acid diglycidylester to an acid number <2 at 100° C.

Viscosity=3,400 mPas (20° C.)
Epoxide content=6.1%
Epoxide equivalent weight=690
OH number=55.

Epoxide II. A mixture of 370 g of octaethyleneglycol, 196 g of maleic-acid anhydride and 0.5 g of hydroquinone was heated at 100° C. to an acid number of 198 and subsequently heated at 100° C. with 720 g of hexahydrophthlaic-acid diglycidylester to an acid number<2.

OH number=90
Epoxide content=9.0%
Epoxide equivalent weight=460.

Epoxide III

A mixture of 423 g of polypropyleneglycol with an OH number of 265, 196 g of maleic acid anhydride and 0.5 g of hydroquinone was heated at 100° C. to an acid number of 181 and subsequently heated at 100° C. with 1,000 g of bisphenol A-bis-glycidylether having an epoxide equivalent weight of 250 to an acid number<2.

Epoxide content=5.2%
Epoxide equivalent weight=810
OH number=69.

Epoxide IV 298 g of ricinus oil and 500 g of bisphenol A-bis-glycidylether with an epoxide equivalent weight of 250 were heated to an acid number <2 at 90° C.

Epoxide content=6.6%
Epoxide equivalent weight=640
OH number=140.

Epoxide V 298 g of ricinus oil and 380 g of hexahydrophthalic acid diglycidyl-ester with an epoxy equivalent weight of 180 were heated at 90° C. to an acid number <2

Epoxide content=7.5%
Epoxide equivalent weight=560
OH number=165.

Epoxide VI

Bifunctional epoxide based on bisphenol-A-bisglycidylether having an epoxide equivalent weight of 190.

Epoxide VII

Bifunctional epoxide based on bisphenol A-bisglycidylether having an epoxide equivalent weight of 450 [available under the name Epicote 1001 from Shell].

Epoxide VIII

Bifunctional epoxide based on bisphenol A-glycidylether having an epoxide equivalent weight of 250 [available under the name Epicote 834 from Shell].

Epoxide IX

Bifunctional epox based on hexahydrophthalic acid bisglycidyl-ester having an epoxide equivalent weight of 180.

Epoxide X

Hexadecene-1-oxide (available under the name PEROXIDCHEMIE from Hoellrigelskreuth bei Muenchen). Epoxide equivalent weight=156.

Epoxide XI

A mixture of 480 g of a polyether having a molecular weight of 4,800 (made by addition of propylene oxide (87%) and ethylene oxide (13%) to trimethylolpropane) and 30 g of succinic acid anhydride was heated at 100° C. to an acid number of 33 and subsequently heated together with 150 g of the bisphenol A-bisglycidylether having an epoxide equivalent weight of 250 at 100° C. to an acid number of 2.

Epoxide content=2%
Epoxide equivalent weight=2,200
OH number=25.

Epoxide XII

Bifunctional epoxide based on aniline (available under the name Lekutherm X 50 from Bayer AG), having an epoxide equivalent weight of 125.

Epoxide XIII

Glycidylphenylether. Epoxide equivalent weight 150.

Epoxide XIV

Epoxidized soybean oil, epoxide content=6.3% (available under the name EDENOL D 82 from Henkel-Dehydag). Epoxide equivalent weight=254.

Epoxide XV

Epoxidized linseed oil, epoxide content=8.5% (available under the name EDENOL B 316 from Henkel-Dehydag), having an epoxide equivalent weight of 188.

Manufacture and testing of PVC foils back-foamed with semi-rigid polyurethane foams The following polyrethane-forming raw materials were used in the back-foaming procedure.

The amount of polyether polyol indicated in Tables 1, 2 and 3 (molecular weight of 4,800 and prepared by adding propylene oxide (87%) and ethylene oxide (13%) to trimethylolpropane), 2.0 g of water, 2 g of tall oil and the activators indicated in Tables 1, 2 and 3 were mixed with the stated quantity of polyphenyl-polymethylene-polyisocyanate (prepared by phosgenating an aniline-formaldehyde condensate and having a NCO content of 31 wt %). This mixture was then introduced into the mold described below.

If necessary, the polyether was mixed with the epoxide with slight heating to obtain a clear epoxide solution.

An undyed, commercial PVC foil about 0.7 mm thick was placed in a thermostatically controllable metal-plate mold 20×20×4 cm. The mold was back-filled with the above-described mixture of raw materials automatically. Removal from the mold took place after a reaction and hardening time of 5 min Tables 1 and 2 show that the polyurethane (PUR) foams made according to the invention exhibit a much improved foil stability over those of the state of the art and that foil and PUR foam retain the polymer properties of the unstressed state.

The manufactured molded parts with back-foamed PVC foils were separately tempered for 500 h at 120° C. in a circulating-air drying oven prior to determining color foil elasticity and foam structure.

The increased value shown in Table 3 for the rupture-elongation of the foils following tempering of the composite material quantify the improvement over the control test listed therein.

The special superiority of the fatty-acid epoxides of Examples 21 through 24 is demonstrated by the fact that these types would not post-harden when the polyurethane foam was thermally stressed and retained their initial elasticity.

The formulations of the Examples 21 through 24 which included epoxide, polyol, water and activators showed good storage properties and lack of activity losses even after several months.

The polyurethane foams of Examples 7, 8, 9, 10, 11, 12, 18, 19, 20 postcured in the course of the 500 h test at 120° C.

TABLE 1

| EXAMPLES | Control Tests | | | | | | Invention | | | | | |
|---|---|---|---|---|---|---|---|---|---|---|---|---|
| | 1 | 2 | 3 | 4 | 5 | 6 | 7 | 8 | 9 | 10 | 11 | 12 |
| Polyether (pbw) | 90 | 90 | 90 | 88 | 88 | 88 | 80 | 80 | 80 | 85 | 85 | 85 |
| Epoxide | — | — | — | VIII | VIII | VIII | VIII | VIII | VIII | IX | VII | VI |
| Epoxide (pbw) | — | — | — | 2 | 2 | 2 | 10 | 10 | 10 | 5 | 5 | 5 |
| Isocyanate (pbw) | 42 | 42 | 42 | 42 | 42 | 44 | 41 | 41 | 41 | 41 | 41 | 41 |
| Activator Niax A1[1](pbw) | 0.4 | — | — | 0.4 | — | — | 0.4 | — | — | — | — | — |
| Dabco[2] 33LV (pbw) | — | 0.4 | — | — | 0.4 | — | — | 0.4 | — | — | — | — |
| Dibutyl-tin Dilaurate (pbw) | — | — | 0.1 | — | — | 0.1 | — | — | 0.1 | 0.1 | 0.1 | 0.1 |
| | Untreated | | | | | | after 500 h at 120° C. | | | | | |
| Color* | 1 | 4 | 4 | 3 | 2 | 2 | 1 | 2 | 2 | 1 | 1 | 1 | 1 |
| Foil Elasticity** | 1 | 4 | 4 | 3-4 | 2 | 2 | 2 | 2 | 2 | 2 | 2 | 2 | 2 |
| Foam structure at foil boundary*** | 1 | 3 | 3 | 3 | 1 | 1 | 1 | 1 | 1 | 1 | 1 | 1 | 1 |

| EXAMPLES | Control Tests | | | | | | Invention | | | | | |
|---|---|---|---|---|---|---|---|---|---|---|---|---|
| | 13 | 14 | 15 | 16 | 17 | 18 | 19 | 20 | 21 | 22 | 23 | 24 |
| Polyether (pbw) | 85 | 85 | 80 | 80 | 80 | 85 | 85 | 75 | 80 | 80 | 80 | 80 |
| Epoxide | V | V | I | II | III | X | XII | XII | XIV | XIV | XV | XV |
| Epoxide (pbw) | 5 | 5 | 10 | 10 | 10 | 5 | 5 | 15 | 10 | 10 | 10 | 10 |
| Isocyanate (pbw) | 43 | 43 | 42 | 43 | 41 | 41 | 41 | 40 | 41 | 41 | 41 | 41 |
| Activator Niax A1[1](pbw) | — | — | — | — | — | — | — | — | — | 0.4 | — | 0.4 |
| Dabco[2] 33LV (pbw) | 0.4 | — | — | — | — | — | — | — | — | — | — | — |
| Dibutyl-tin Dilaurate (pbw) | — | 0.1 | 0.1 | 0.1 | 0.1 | 0.1 | 0.1 | 0.1 | 0.1 | — | 0.1 | — |
| | after 500 h at 120° C. | | | | | | | | | | | |
| Color* | 2 | 1 | 1 | 1 | 1 | 1 | 1 | 1 | 1 | 1 | 1 | 1 |
| Foil Elasticity** | 2 | 2 | 2 | 2 | 2 | 2 | 2 | 2 | 2 | 2 | 2 | 2 |
| Foam structure at foil boundary*** | 1 | 1 | 1 | 1 | 1 | 1 | 1 | 1 | 1 | 1 | 1 | 1 |

*color classification: 1 = beige; 2 = dark-beige; 3 = dark brown; 4 = black
**foil elasticity: 1 = highly elastic; 2 = elastic; 3 = embrittled; 4 = totally brittle;
***foam structure at foil boundary: 1 = elastic; 2 = friable; 3 = highly friable
[1]activator available from Union Carbide Corp.
[2]Triethylenediamine available from Air Products & Chemicals, Inc.

TABLE 2

| Example | Control test | 1 | 2 | 3 |
|---|---|---|---|---|
| Polyether (pbw) | 90 | 95 | 90 | 80 |
| Epoxide of Example | — | XII | XII | XII |
| Epoxide (pbw) | — | 5 | 10 | 20 |
| Isocyanate (pbw) | 42 | 44 | 42 | 36 |
| Dibutyl tin dilaurate (pbw) | 0.1 | 0.1 | 0.1 | 0.1 |
| Foil rupture-elongation (%), no foam* | 185 | 185 | 185 | 185 |
| Rupture-elongation (%) of foils separated from foam** | 80 | 150 | 155 | 160 |

*rupture-elongation of pure PVC foils after 500 h at 120° C. in tensile test per DIN 53 504
**the back-foamed PVC foils were peeled off the foam following the 500 h test at 120° C. and the rupture-elongation was tested in tension per DIN 53 504.

TABLE 3

Raw material composition in parts by weight, thermal loads on and rupture-elongations of foils

| Example | Control test | 1 |
|---|---|---|
| Polyether | 90 | 80 |
| Epoxide of Example | — | XV |
| Epoxide parts by weight | — | 20 |
| Isocyanate | 42 | 36 |
| Dibutyl tin dilaurate | 0.1 | 0.1 |
| Rupture-elongation (%) of foils without foam* | 185 | 185 |
| Rupture-elongation (%) | 80 | 155 |

TABLE 3-continued

| Raw material composition in parts by weight, thermal loads on and rupture-elongations of foils | | |
|---|---|---|
| Example | Control test | 1 |
| foils separated from foam** | | |

*rupture-elongation of pure PVC foils after 500 h at 120° C. in tension test DIN 53,504.
**The rear-foamed PVC foils are peeled from the foam after the 500 h, 120° C. test and the rupture-elongation is then carried out per DIN 53,504.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyurethane which is combined with or applied to another non-polyurethane material comprising reacting
   (a) a polyisocyanate
   with
   (b) a compound having at least two hydrogen atoms which are reactive with isocyanate groups and a molecular weight of from 400 to 10,000 in the presence of
   (c) a catalyst and
   (d) 0.01 to 50 parts by weight (based on 100 parts by weight of (b)) of a stabilizer against thermolysis and contact discoloration which is an epoxide having an epoxide equivalent weight between 57 and 10,000 and combining or applying the reaction mixture or the reaction product with or to another non-polyurethane material.

2. The process of claim 1 in which the reaction is carried out in the presence of a chain extender having a molecular weight of from 32 to 399 and/or a foam stabilizer and/or a blowing agent.

3. The process of claim 1 in which stabilizer (d) has an epoxide equivalent weight of from 75 to 3000.

4. The process of claim 1 in which stabilizer (d) has an epoxide equivalent weight of from 100 to 1000.

5. The process of claim 1 in which the other non-polyurethane material is selected from PVC; ABS; mixtures of PVC and ABS; polyvinylacetate; polyvinylbutyral; copolymers and homopolymers based on vinyl chloride, styrene, butadiene, isoprene, chloroprene, dichlorobutadiene, ethylene, propene, acrylonitrile and their chloro-derivatives and chlorosulfonation derivatives; lacquers based on cellulose esters or cellulose ethers, polyester resins, epoxy resins, alkyd resins or oil; cotton and leather.

6. The process of claim 5 in which the other nonpolyurethane material is in the form of a foil, coating or edging.

7. The process of claim 1 in which stabilizer (d) is an epoxidation product of an unsaturated fatty acid ester.

8. The process of claim 1 in which stabilizer (d) is an epoxide of linseed oil, soybean oil, coconut oil, risinus oil, palm oil or olive oil.

9. The process of claim 1 in which stabilizer (d) is a polyfunctional epoxide of a polyglycidyl ether, a polyglycidyl ester and/or 1,2-polyepoxide having at least one tertiary nitrogen atom.

10. The process of claim 1 in which stabilizer (d) is a relatively high molecular weight epoxide formed by reacting an excess of a polyglycidyl ether, polyglycidyl ester and/or 1,2-polyepoxide containing at least one tertiary nitrogen atom with a carboxyl group containing polyether polyol or polyester polyol.

11. The process of claim 1 in which stabilizer (d) is bisphenol A bisglycidylether and its higher homologs.

12. The product of the process of claim 1.

13. The product of the process of claim 2.

14. The product of the process of claim 5.

15. The product of the process of claim 11.

* * * * *